(12) United States Patent
Shen

(10) Patent No.: US 11,246,127 B2
(45) Date of Patent: Feb. 8, 2022

(54) MULTIPLE RESOURCE SET CONFIGURATION

(71) Applicant: Guangdong OPPO Mobile Telecommunications Corp., Ltd., Guangdong (CN)

(72) Inventor: Jia Shen, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/884,924

(22) Filed: May 27, 2020

(65) Prior Publication Data

US 2020/0288449 A1    Sep. 10, 2020

Related U.S. Application Data

(63) Continuation of application No. PCT/CN2018/119232, filed on Dec. 4, 2018.

(60) Provisional application No. 62/594,107, filed on Dec. 4, 2017.

(51) Int. Cl.
    *H04W 72/04* (2009.01)
    *H04L 5/00* (2006.01)

(52) U.S. Cl.
    CPC ......... *H04W 72/042* (2013.01); *H04L 5/0048* (2013.01)

(58) Field of Classification Search
    None
    See application file for complete search history.

(56) References Cited

U.S. PATENT DOCUMENTS

| 9,215,058 | B2 | 12/2015 | Heo |
| 9,357,463 | B2 | 5/2016 | Bangolae et al. |
| 9,686,677 | B2 | 6/2017 | Pinheiro et al. |
| 9,801,054 | B2 | 10/2017 | Oyman |
| 9,998,268 | B2 | 6/2018 | Heo et al. |
| 2013/0235812 | A1 | 9/2013 | Heo |
| 2014/0247759 | A1 | 9/2014 | Zhang |
| 2014/0307872 | A1 | 10/2014 | Heo |
| 2015/0004969 | A1 | 1/2015 | Han |
| 2015/0009870 | A1 | 1/2015 | Bashar |

(Continued)

FOREIGN PATENT DOCUMENTS

| CN | 103581094 A | 2/2014 |
| CN | 104009827 A | 8/2014 |

(Continued)

OTHER PUBLICATIONS

International Application No. PCT/CN2018/119232, International search report, dated Feb. 25, 2019, 4 pages.

(Continued)

*Primary Examiner* — Kouroush Mohebbi
(74) *Attorney, Agent, or Firm* — Perkins Coie LLP

(57) ABSTRACT

Embodiments of the application provide a method for multiple resource set configuration. A device of the network obtains a configuration associated with a physical layer (PHY) channel, then the device selects a set of resources corresponding to the configuration from a plurality of resources and determines an actual resource from the selected set of resources to cause another device to transmit or receive a corresponding PHY signal on the determined actual resource.

9 Claims, 10 Drawing Sheets

(56) References Cited

U.S. PATENT DOCUMENTS

| | | | |
|---|---|---|---|
| 2015/0201374 A1 | 7/2015 | Yeh et al. | |
| 2015/0341838 A1 | 11/2015 | Pinheiro et al. | |
| 2016/0105266 A1 | 4/2016 | Heo et al. | |
| 2016/0183149 A1 | 6/2016 | Stojanovski et al. | |
| 2017/0142691 A1 | 5/2017 | Sirotkin | |
| 2019/0149380 A1* | 5/2019 | Babaei | H04L 5/001 370/330 |
| 2019/0342944 A1* | 11/2019 | Chatterjee | H04W 72/044 |

FOREIGN PATENT DOCUMENTS

| | | |
|---|---|---|
| CN | 104871447 A | 8/2015 |
| CN | 107294682 A | 10/2017 |
| EP | 2823652 A1 | 1/2015 |
| WO | 2019028276 A1 | 2/2019 |

OTHER PUBLICATIONS

Mediatek Inc., "Summary of Bandwidth Part Operation", GPP TSG RAN WG1 Meeting 91, R1-1721504, Dec. 1, 2017, Reno, USA, 13 pages.

Ericsson: "Remaining issues for Scheduling Request", 3GPP Draft: R2-1711178—Remaining Issues for Scheduling Request, 3rd Generation Partnership Project (3GPP), Mobile Competence Centre 650, Route Deslucioles: F-06921 Sophia-Antipolis Cedex ; Franc, vol. RAN WG2, No. Prague, Czech Republic; Oct. 9, 2017-Oct. 13, 2017 Oct. 2017 (Oct. 8, 2017), XP051343186.

Huawei et al: "Remaining issues for CSI framework", 3GPP Draft: R1-1719426, 3rd Generation Partnership Project (3GPP), Mobile Competence Centre; 650, Route Deslucioles: F-06921 Sophia-Antipolis Cedex: France, Dec. 1, 2017 (Dec. 1, 2017), pp. 1-8, XP051369128.

Qualcomm Incorporated: "Open Issues on CA", 3GPP Draft; R1-1718581 Open Issues on CA, 3rd Generation Partnership Project (3GPP), Mobile Competence Centre 650, Route Deslucioles: F-06921 Sophia-Antipolis Cedex; France, vol. RAN WG1, No. Prague, Czech Republic; Oct. 9, 2017 Oct. 13, 2017, Oct. 8, 2017 (Oct. 8, 2017), XP051341761.

Supplementary European Search Report in the European application No. 18885826.0, dated Jan. 29, 2021.

Written Opinion of the International Search Authority in the international application PCT/CN2018/119232, dated Feb. 25, 2019.

Office Action of the Indian application No. 202027028056, dated Jun. 23, 2021. 6 pages with English translation.

First Office Action of the European application No. 18885826.0, dated Oct. 22, 2021. 7 pages.

* cited by examiner

MULTIPLE RESOURCE SET CONFIGURATION

CROSS-REFERENCES TO RELATED APPLICATIONS

This application is a continuation of and claims priority to International Patent Application PCT/CN2018/119232, filed Dec. 4, 2018, which claims priority to U.S. Provisional Patent Application 62/594,107, filed Dec. 4, 2017, the contents of which are hereby incorporated by reference in their entirety.

BACKGROUND OF THE INVENTION

Technical Field

The present description relates in general to wireless communication networks, and more particularly to, for example, without limitation, multiple resource set configuration.

Related Art

In $4^{th}$ generation (4G) Long-Term Evolution (LTE) broadband cellular network technology, the time and frequency resource of physical layer (PHY) channels are indicated directly by downlink (DL) control information (DCI). For a DL or uplink (UL) PHY channel, only one resource indication approach is used. The scheduling granularity in the time domain is denoted by a slot or sub-frame, whereas the scheduling for multiple stations in the frequency domain occupy different portions of the system bandwidth of a cell.

In $5^{th}$ generation (5G) broadband cellular network technology, requirements have increased for scheduling flexibility in time and frequency domains. In the time domain, the scheduling is based on a slot and symbol level. In the frequency domain, the scheduling range is partitioned into a bandwidth part (BWP), which may be different for different stations. The code domain resource is indicated for some PHY control channels, as in 4G LTE.

DETAILED DESCRIPTION OF THE INVENTION

Figure 1:
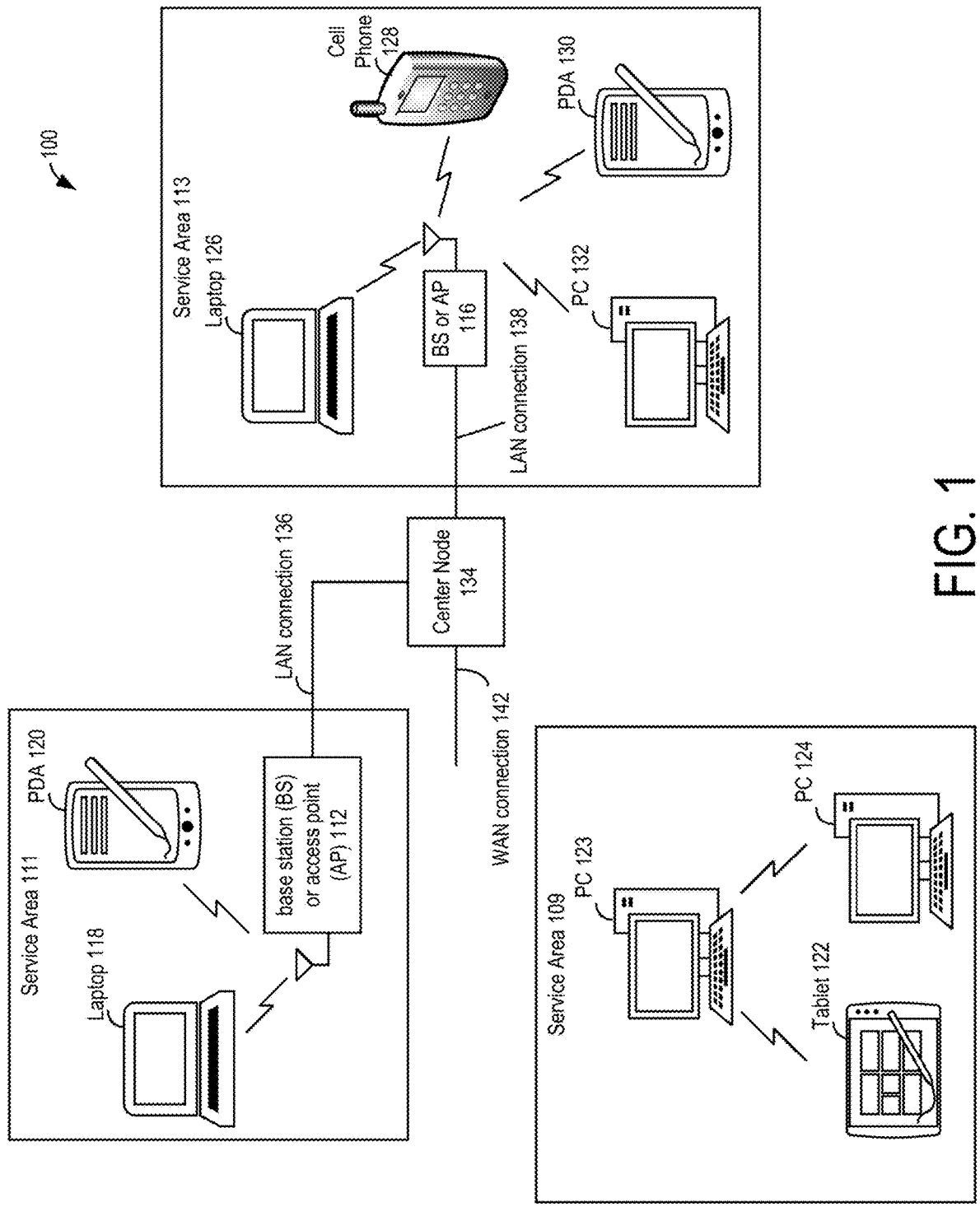
FIG. 1 is a diagram illustrating a wireless communication system in accordance with one or more implementations.

The detailed description set forth below is intended as a description of various implementations and is not intended to represent the only implementations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without one or more of these specific details. As those skilled in the art would realize, the described implementations may be modified in various different ways, all without departing from the scope of the present disclosure. Accordingly, the drawings and description are to be regarded as illustrative in nature and not restrictive. In one or more instances, structures and components are shown in block diagram form in order to avoid obscuring the concepts of the subject technology.

In 4G LTE, the same set(s) of resources are configured for a PHY channel regardless of different configurations in other domains. However, the potential of 5G systems to have flexible scheduling with acceptable signaling overhead by way of a direct DCI indication approach may not be fully exploited. The subject technology provides for configuring different set(s) of resources corresponding to different configurations in at least one domain among the following: demodulation reference signal (DM-RS) mapping type, bandwidth part (BWP) configuration, component carrier (CC), serving cell, transmission waveform or multiple access scheme, PDCCH configuration. By configuring different resource set(s) in each of above-mentioned domains, the number of resources can be doubled. Therefore, the subject technology provides for a novel approach that can achieve substantially larger flexibility than the legacy 4G LTE approach without any additional PHY signaling overhead.

It should be understood, technical solutions of the implementations of the subject disclosure can be applied to various communication systems, such as the New Radio 5th Generation broadband cellular network system (referred to as "5G"), long term evolution (long Term Evolution, referred to as "LTE") broadband cellular network system, and other future communication systems.

The station described herein in connection with various implementations may also refer to a user terminal device (User Equipment, referred to as "UE"), an access terminal, a subscriber unit, a subscriber station, a mobile station, a remote station, a remote terminal, a mobile device, a user terminal, a terminal, a terminal device, a wireless communication device, a user agent, or a user device. The station may be a smartphone, a cellular telephone, a cordless telephone, a Session Initiation Protocol (Session Initiation Protocol, referred to as "SIP") phone, a wireless local loop (Wireless Local Loop, referred to as "WLL") station, a personal digital assistant (Personal Digital Assistant, referred to as "PDA"), a handheld device having wireless communication capabilities, a computing device, or other processing device connected to a vehicle device, a wireless modem, a wearable device, a 5G broadband cellular network or a terminal device of a future evolution of the public land mobile communications network (Public Land Mobile network, abbreviated "PLMN") in network terminal equipment.

The subject application is described in conjunction with various network device implementations. A network device may be a device communicating with a terminal apparatus, for example, where the network device may be an LTE evolved base station (Evolutional Node B, referred to as "eNB" or an "eNodeB"), a New Radio 5th Generation broadband cellular network base station (Next Generation Node B, referred to as "gNB" or a "gNodeB"), or the network device may be a relay station, access point, a vehicle-mounted device, a wearable device or a future broadband cellular network network-side device.

The term "downlink control information" or referred to as "DCI," as used herein, generally refers to a special set of information that describes an uplink resource allocation for scheduling a downlink data channel (e.g., PDSCH) or an uplink data channel (e.g., PUSCH). In some aspects, the DCI includes a description about downlink data transmitted to the UE. The term "bandwidth part" or referred to as "BWP," as used herein, generally refers to a contiguous set of physical resource blocks selected from a contiguous subset of common resource blocks for a given numerology on a given carrier. The term "control-resource set" or referred to as "CORESET," as used herein, generally refers to a set made up of multiple resource blocks in frequency domain and an integer number of orthogonal frequency division multiplexing (OFDM) symbols in time domain, where each resource block includes multiple resource elements respectively made up of one subcarrier in frequency domain and one OFDM symbol in time domain. The term "radio resource control signaling" or referred to as "RRC signaling," as used herein, generally refers to a control mechanism to control radio resources required to make radio communication between the UE and a base station by exchanging information about the configured radio resources between the UE and the base station.

FIG. 1 is a diagram illustrating wireless communication system 100 in accordance with one or more implementations. Not all of the depicted components may be required; however, one or more implementations may include additional components not shown in the figure. Variations in the arrangement and type of the components may be made without departing from the scope of the claims as set forth herein. Additional components, different components, or fewer components may be provided.

Wireless communication system 100 includes base stations and/or access points 112, 116, wireless communication devices 118-132 and a center node 134. Note that the center node 134 includes a core network device, and the core network device or a part function of the core network device (e.g., a user plane function) can be integrated into the base stations and/or access points 112. Further note that wireless communication devices 118-132 may be laptop host computers 118 and 126, personal digital assistant hosts 120 and 130, personal computer hosts 124 and 132, a tablet host 122, a cellular telephone host 128 or other stations as stated above.

Wireless communication devices 122, 123, and 124 are located within independent service area 109 and communicate directly (e.g., point to point). In this configuration, wireless communication devices 122, 123, and 124 may only communicate with each other. To communicate with other wireless communication devices within the wireless communication system 100 or to communicate outside of the wireless communication system 100, wireless communication devices 122, 123, and/or 124 can affiliate with one of the base stations or access points 112 or 116.

The base stations or access points 112, 116 are located within service areas 111 and 113, respectively, and are operably coupled to the center node 134 via local area network connections 136, 138. Such a connection provides the base station or access points 112, 116 with connectivity to other devices within the wireless communication system 100 and provides connectivity to other networks via the WAN connection 142. To communicate with wireless communication devices 118-132 within service areas 111 and 113, each of the base stations or access points 112, 116 has an associated antenna or antenna array. In one or more implementations, base station or access point 112 wirelessly communicates with wireless communication devices 118 and 120 while base station or access point 116 wirelessly communicates with wireless communication devices 126-132. Wireless communication devices 118-132 can register with a particular base station or access point 112, 116 to receive services from the wireless communication system 100.

According to some implementations, base stations are used for broadband cellular network systems (e.g., 5G, LTE, advanced mobile phone services (AMPS), digital AMPS, GSM, CDMA, local multi-point distribution systems (LMDS), multi-channel-multi-point distribution systems (MMDS), enhanced data rates for GSM evolution (EDGE), general packet radio service (GPRS), high-speed downlink packet access (HSDPA), high-speed uplink packet access (HSDPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 2:
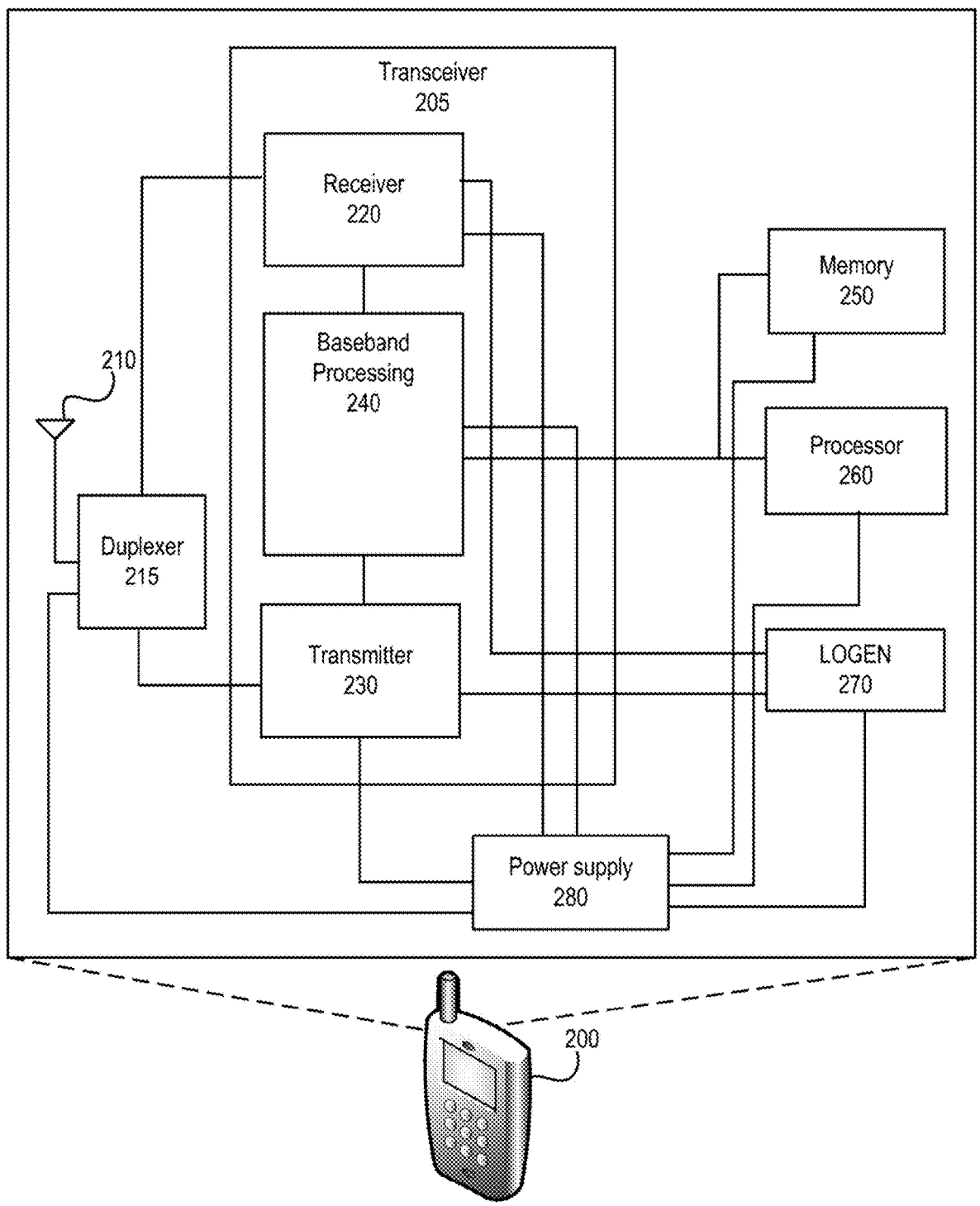
FIG. 2 is a diagram illustrating a wireless communication device that includes a host device and an associated radio in accordance with one or more implementations.

FIG. 2 illustrates an example wireless communication device 200 in accordance with one or more implementations of the subject technology. Not all of the depicted components may be required; however, one or more implementations may include additional components not shown in the figure. Variations in the arrangement and type of the components may be made without departing from the scope of the claims as set forth herein. Additional components, different components, or fewer components may be provided.

The wireless communication device 200 includes a radio frequency (RF) antenna 210, a duplexer circuit 215, a transceiver circuit 205, a memory 250, a processor 260, a local oscillator generator (LOGEN) 270, and a power supply circuit 280. The transceiver circuit 205 includes a receiver circuit 220, a transmitter circuit 230. The wireless communication device 200 further includes a baseband processing circuit 240. The baseband processing circuit 240 is usually separated from the transceiver. In another example, the baseband processing circuit 240 also can be integrated with the transceiver to form one component (as shown in FIG. 2). In various embodiments of the subject technology, one or more of the blocks represented in FIG. 2 may be integrated on one or more semiconductor substrates. For example, the blocks 220-270 may be realized in a single chip or a single system on chip, or may be realized in a multi-chip chipset. In various implementations, one or more blocks may be added. In various implementations, one or more blocks shown may be removed or replaced with other one or more blocks. The wireless communication device 200 corresponds to, or includes at least a portion of, the wireless communication device 128.

The RF antenna 210 may be suitable for transmitting and/or receiving RF signals (e.g., wireless signals) over a wide range of frequencies (e.g., 400 MHz-6 GHz, 20 GHz-44 GHz, 20 GHz-86 GHz, 24 GHz-53 GHz, 86 GHz-98 GHz). Although a single RF antenna 210 is illustrated, the subject technology is not so limited.

The duplexer circuit 215 may provide isolation in the transmit band to avoid saturation of the receiver circuit 220 or damaging parts of the receiver circuit 220, and to relax one or more design requirements of the receiver circuit 220. Furthermore, the duplexer circuit 215 may attenuate noise in the receive band. The duplexer circuit 215 may be operable in multiple frequency bands of various standards (e.g., wireless standards, broadband cellular standards). The duplexer circuit 215 may consist of a transmit/receive (T/R) switch, which is used to select either Receive or Transmit modes for the wireless communication device 200. The T/R switch may be controlled by the baseband processing circuit 240.

The receiver circuit 220 may include suitable logic circuitry and/or code that may be operable to receive and process incoming RF signals from the RF antenna 210. The receiver circuit 220 may, for example, be operable to amplify and/or down-convert received wireless signals. In some implementations of the subject technology, the receiver circuit 220 may be operable to cancel noise in received signals and may be linear over a wide range of frequencies. In this manner, the receiver circuit 220 may be suitable for receiving signals in accordance with a variety of wireless standards and broadband cellular standards. By way of non-limiting example, such standards may include 5G, 4G LTE, 3G, GSM, Wi-Fi, WiMAX, and Bluetooth.

The transmitter circuit 230 may include suitable logic circuitry and/or code that may be operable to process and transmit signals from the RF antenna 210. The transmitter circuit 230 may, for example, be operable to up-convert baseband processing signals to outgoing RF signals and amplify the outgoing RF signals. In some implementations of the subject technology, the transmitter circuit 230 may be operable to up-convert and amplify baseband signals processed in accordance with a variety of wireless standards. In some implementations of the subject technology, the transmitter 230 may be operable to provide signals for further amplification by one or more power amplifiers. In one or more implementations, the transmitter 230 includes a power amplifier for amplifying the outgoing RF signals.

The baseband processing circuit 240 may include suitable logic, circuitry, interfaces, and/or code that may be operable to perform processing of baseband signals. The baseband processing circuit 240 may, for example, analyze received signals and generate control and/or feedback signals for configuring various components of the wireless communication device 200 such as the receiver circuit 220. The baseband processing circuit 240 may be operable to encode, decode, transcode, modulate, demodulate, encrypt, decrypt, scramble, descramble, and/or otherwise process data in accordance with one or more broadband cellular standards.

The memory 250 may include suitable logic, circuitry, and/or code that may enable storage of various types of information such as received data, generated data, code, and/or configuration information. The memory 250 may include, for example, random access memory (RAM), read-only memory (ROM), flash, and/or magnetic storage. In some implementations of the subject technology, information stored in the memory 250 may be utilized for configuring the receiver circuit 220 and/or the baseband processing circuit 240.

The processor 260 may include suitable logic, circuitry, and/or code that may enable processing data and/or controlling operations of the wireless communication device 200. In this regard, the processor 260 may be enabled to provide control signals to various other portions of the wireless communication device 200. The processor 260 may also control transfers of data between various portions of the wireless communication device 200. Additionally, the processor 260 may enable implementation of an operating system or otherwise execute code to manage operations of the wireless communication device 200.

The local oscillator generator (LOGEN) 270 may include suitable logic, circuitry, interfaces, and/or code that may be operable to generate one or more oscillating signals of one or more frequencies. The LOGEN 270 may be operable to generate digital and/or analog signals. In this manner, the LOGEN 270 may be operable to generate one or more clock signals and/or sinusoidal signals. Characteristics of the oscillating signals such as the frequency and duty cycle may be determined based on one or more control signals from, for example, the processor 260 and/or the baseband processing circuit 240. In one or more implementations, the LOGEN 270 may employ a crystal oscillator to generate the clock signals and/or sinusoidal signals.

The power supply 280 may include suitable logic, circuitry, and/or code that may be operable to supply power (e.g., regulated voltages) to components within the wireless communication device 200. For example, the power supply 280 can supply power to the duplexer 215, the receiver 220, the transmitter 230, the baseband processing circuit 240, the memory 250, the processor 260, and the LOGEN 270.

In operation, the processor 260 may configure the various components of the wireless communication device 200 based on a standard according to which the wireless communication device 200 receives signals. Wireless signals may be received via the RF antenna 210 and amplified and down-converted by the receiver circuit 220. The baseband processing circuit 240 may perform noise estimation and/or noise cancellation, decoding, and/or demodulation of baseband signals. In this manner, information in the received signal may be recovered and utilized appropriately. For example, the information may be audio, text, images, video, multimedia and/or control signals to be presented to a user of the wireless communication device 200, data to be stored to the memory 250, and/or information affecting and/or enabling operation of the wireless communication device 200. The baseband processing circuit 240 may modulate, encode, and perform other processing on be audio, text, images, video, multimedia and/or control signals to be transmitted by the transmitter circuit 230 in accordance with various standards. The power supply 280 may provide one or multiple regulated rail voltages for various components of the wireless communication device 200.

In certain broadband cellular network standards, such as 5G, a physical channel can be classified into a downlink channel, e.g., a physical downlink shared channel (PDSCH) and a physical downlink control channel (PDCCH), and an uplink channel, e.g., a physical uplink shared channel (PUSCH) and a physical uplink control channel (PUCCH). The PDCCH signal is used to transfer downlink control information that informs a user device about resource allocations or scheduling related to downlink resource assignments on the PDSCH, uplink resource grants, and uplink power control commands. The PDCCH signal is demodulated at the user device based on a cell-specific reference signal (CRS). In the 5G broadband cellular network system, a start symbol in a physical resource block (referred to as "PRB") may be indicative of control information in a downlink transmission (e.g., downlink control information, referred to as "DCI").

It should also be appreciated that physical resources in an implementation of the subject technology may include time-domain and frequency-domain resources. In the time domain, the resource has an occupancy of M symbols (e.g., OFDM symbols), where M is a positive integer equal to or greater than 1. In the frequency domain, the frequency-domain resource has an occupancy of N units, where each unit includes K consecutive subcarriers in the frequency-domain, and where N is a positive integer greater than or equal to 1, and K is a positive integer equal to or greater than 2. The physical resources may further include a time-domain resource, and at least one of a frequency-domain resource, a code-domain resource or a spatial-domain resource.

Figure 3:
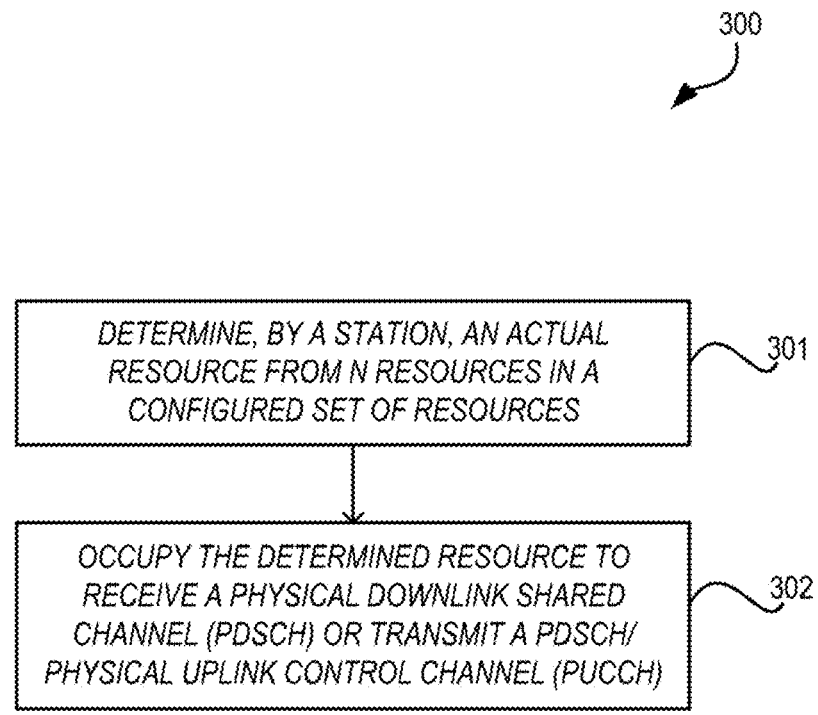
FIG. 3 illustrates a flow diagram of an example process for determining a resource from a set of configured resources.

FIG. 3 illustrates a flow diagram of an example process 300 for determining a resource from a set of configured resources. Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

In 4G LTE, the same set(s) of resources are configured for a PHY channel regardless of different configurations in other domains. With a significantly limited bit width in the resource allocation bit-field of the DCI in order to keep the DCI under an acceptable signaling overhead, the number of configurable resources are significantly limited. A combination of RRC configuration and DCI indication can be used for the resource allocation in a 5G system, e.g., a set of candidate resources are configured by RRC signaling, and then the DCI indicates an index of a resource in a "resource table" or "resource set" as depicted in FIG. 3.

In this respect, the process 300 starts at step 301, where a station (e.g., 128, 200) determines an actual resource from N resources in a configured set of resources, where N is a positive integer. Next, at step 302, the station occupies the determined resource to receive a PDSCH signal in a downlink transmission from a base station (e.g., 116) or transmit a PDSCH/PUCCH signal in an uplink transmission to the base station. However, since the acceptable DCI signaling overhead is significantly limited, the bit-field width for resource allocation may be only 2 to 6 bits wide. With this limited bit-width, the configured resource set (or table) can only contain N=4-64 resources.

In consideration of multiple dimensions that need to be included in a resource configuration, such as a starting slot, the number of slots, a starting symbol, the number of symbols in a slot, a starting physical resource block (PRB), the number of PRBs, code-domain parameters (e.g. sequence index, cyclic shift (CS) index, orthogonal cover code (OCC) index), and frequency hopping parameters (e.g., hopping on/off, frequency position of 2nd hop), the flexibility provided by one resource set (or table) for a PHY channel is significantly limited. The potential of 5G systems to have flexible scheduling with acceptable signaling overhead by way of a direct DCI indication approach may not be fully exploited.

The subject technology provides for configuring at least two sets of resources for a PHY channel or signal (e.g., PDSCH, PUSCH, PDCCH, PUCCH, a physical random access channel (PRACH), channel state information reference signal (CSI-RS), a scheduling request (SR), or a sounding reference signal (SRS), etc.). Among them, different sets of resources can be configured that correspond to different configurations in at least one domain among the following: demodulation reference signal (DM-RS) mapping type, bandwidth part (BWP) configuration, component carrier (CC), serving cell, transmission waveform or multiple access scheme, PDCCH configuration.

In some examples, different sets of resources can be configured for different DM-RS mapping types, e.g. PDSCH/PUSCH mapping type A and B. With a PDSCH mapping type A, the time position of a first DM-RS symbol may be defined relative to the start of a slot. With a PDSCH mapping type B, the time position of the first DM-RS symbol may be defined relative to the start of a scheduled PUSCH resource. With PUSCH mapping type A, the time position of the first DM-RS symbol may be defined relative to the start of the slot. With a PUSCH mapping type B, the time position of the first DM-RS symbol may be defined relative to the start of the scheduled PUSCH resources.

In other examples, different sets of resources can be configured for different BWP configurations. In still other examples, different sets of resources can be configured for different component carriers (CC) in carrier aggregation. In yet other examples, different sets of resources can be configured for different serving cell configurations. In still yet other examples, different sets of resources can be configured depending on whether a transform precoding is used in an UL transmission for different transmission waveforms or multiple access schemes. In still other examples, different sets of resources can be configured for different PDCCH configurations, e.g. different periodicity configurations and/or time-position configurations of CORESET, search space, and/or monitoring occasions.

In some implementations, a resource is configured with one or multiple parameters in time-domain, frequency-domain, code domain and/or spatial-domain. If two resources are different, the value of at least one parameter is different for the two resources. If two configurations of a set of resources are different, at least one resource in a first set of resources is not included in a second set of resources.

According to one or more implementations of the subject technology, a station (e.g., wireless communication device 128, wireless communication device 200) determines a first resource configuration of a plurality of resource configurations in at least one of a plurality of domains associated with a PHY channel or signal. For example, the station firstly determines, for a PHY channel or a signal (e.g., PDSCH, PUSCH, PUCCH, CSI-RS, SRS, SR, PDCCH, PRACH, etc.), which set of resources to select. The plurality of domains may include, but not limited to, DM-RS mapping type, BWP configuration, component carrier configuration, serving cell configuration, or whether an uplink transmission includes a transform precoding.

The station selects a first set of resources corresponding to the first resource configuration. The station may select the first set of resources based on a first message from a base station (BS) and/or the knowledge of at least one of the aforementioned domains. In some implementations, before the station determines which set of resources to select, the station may obtain or derive from other configurations following a pre-defined principle, control information on at least one of the aforementioned domains through the first message. Within the selected set of resources, the station then determines an actual resource from a plurality of resources in the selected first set of resources for the transmission of the channel or signal based on a second message from the BS and/or an implicit mapping from one or multiple other PHY channels or signals. The station then occupies the determined actual resource to transmit or receive a corresponding PHY channel or signal. In some examples, the first message is included in a header field of a received frame (e.g., downlink frame). The header field may be, or include a portion of, a medium access control (MAC) header. The second message may be included in the same header field as that of the first message in some implementations, or may be included in a different header field than that of the first message in other implementations. In other examples, the second message may be received in a same frame as that of the first message in some implementations, or may be received in a different frame than that of the first message in other implementations.

In other implementations, before the station determines which set of resources to select, the station may receive a first message to obtain or derive from other configurations following a pre-defined principle, control information on at least one of the aforementioned domains. In some examples, the first message is included in a header field of a received frame (e.g., downlink frame). The first message may be included in the same header field as that of the first and second messages in some implementations, or may be included in a different header field than that of the first and second messages in other implementations. In other examples, the first message may be received in a same frame as that of the first and second messages in some implementations, or may be received in a different frame than that of the first and second messages in other implementations. In some implementations, each of the first message, the second message, and/or the first message is, or at least included in a portion of, the downlink control information (referred to as "DCI"). In other implementations, each of the first message, the second message, and/or the first message is, or at least included in a portion of, the radio resource control configuration signaling (referred to as "RRC signaling").

Figure 4:
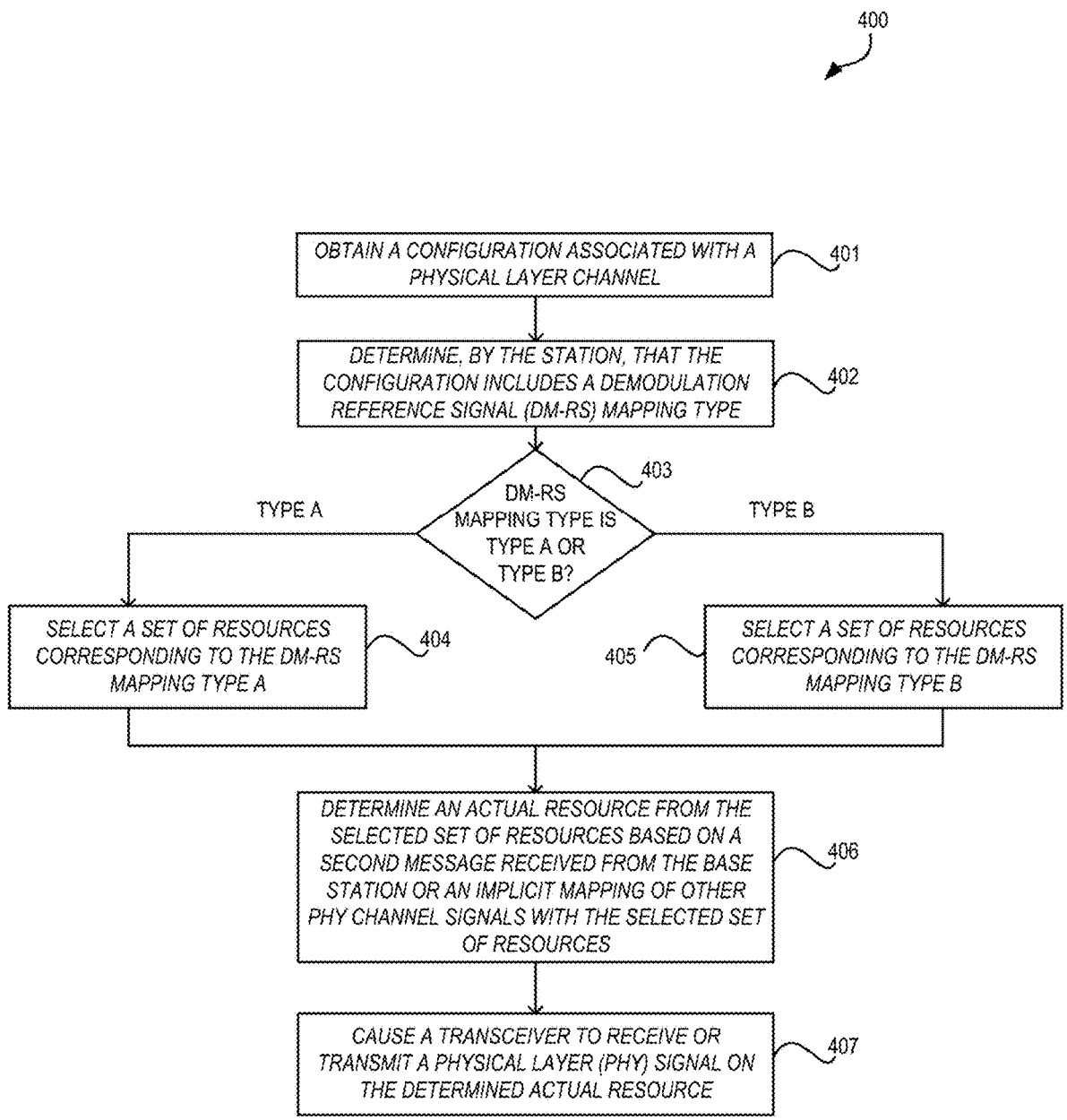
FIG. 4 illustrates a flow diagram of an example process for determining a resource from different resource sets configured for different DM-RS mapping types in accordance with one or more implementations.

FIG. 4 illustrates a flow diagram of an example process 400 for determining a resource from different resource sets configured for different DM-RS mapping types in accordance with one or more implementations. For explanatory purposes, the process 400 is primarily described herein with reference to the receiver 220 of the wireless communication device 200 of FIG. 2. However, the process 400 is not limited to the receiver 220 of the wireless communication device 200 of FIG. 2, and one or more blocks (or operations) of the process 400 may be performed by one or more other components or chips of the wireless communication device 200. The wireless communication device 200 also is presented as an exemplary device and the operations described herein may be performed by any suitable device, such as one or more of the wireless communication devices 118-132. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The process 400 starts at step 401, where a station (e.g., 128, 200) obtains a configuration associated with a PHY channel. Next, at step 402, the station determines that the configuration includes a DM-RS mapping type by receiving a message from a base station (e.g., 116) indicating that a received frame includes a DM-RS mapping type for resource allocation scheduling. In some aspects, the received frame is a downlink frame associated with a downlink transmission with the base station. The received frame may include a PHY channel/signal (e.g., PDSCH, PDCCH). In some implementations, the DM-RS mapping type is associated with the resource allocation scheduling for a downlink transmission. Next, at step 403, the station determines whether the DM-RS mapping type is a PDSCH mapping type A or a PDSCH mapping type B. In other implementations, the DM-RS mapping type is associated with the resource allocation scheduling for an uplink transmission. In this respect, the station may determine whether the DM-RS mapping type is a PUSCH mapping type A or a PUSCH mapping type B. If the DM-RS mapping type is mapping type A, then the process 400 proceeds to step 404. Otherwise, the process 400 proceeds to step 405.

Subsequently, when the DM-RS mapping type is determined to be a mapping type A, at step 404, the station selects a set of resources corresponding to the DM-RS mapping type A. At step 405, where the DM-RS mapping type is determined to be a mapping type B, the station selects a set of resources corresponding to the DM-RS mapping type B. Next, at step 406, the station determines an actual resource from the selected set of resources. In some aspects, the station may perform the selection using an indication included in a second message received from the base station. In other aspects, the station may perform the selection based on an implicit mapping of other PHY channels or signals with one or more resources of the selected set of resources such that an unmapped resource may be derived. Subsequently, at step 407, the station causes its transceiver (e.g., 205) to either receive a PDSCH signal or transmit a PUSCH signal, for example, on the determined actual resource.

In this implementation, different sets of resources are configured for different DM-RS mapping types, e.g. PDSCH/PUSCH mapping type A and B. As depicted in FIG. 4, a station can at first select the resource set(s) corresponding to a DM-RS mapping type, then determine the actual resource used for the transmission of a PHY channel or signal. If based on a certain DCI overhead, N resources can be configured for PDSCH mapping type A and type B, respectively. Overall 2N resources can be configured according to this implementation. In effect, this approach can double the number of candidate resources available for resource allocation scheduling, and helps achieve substantially larger flexibility in resource allocation scheduling than the legacy approach (e.g., 4G LTE) without any additional PHY signaling overhead cost.

Figure 5:
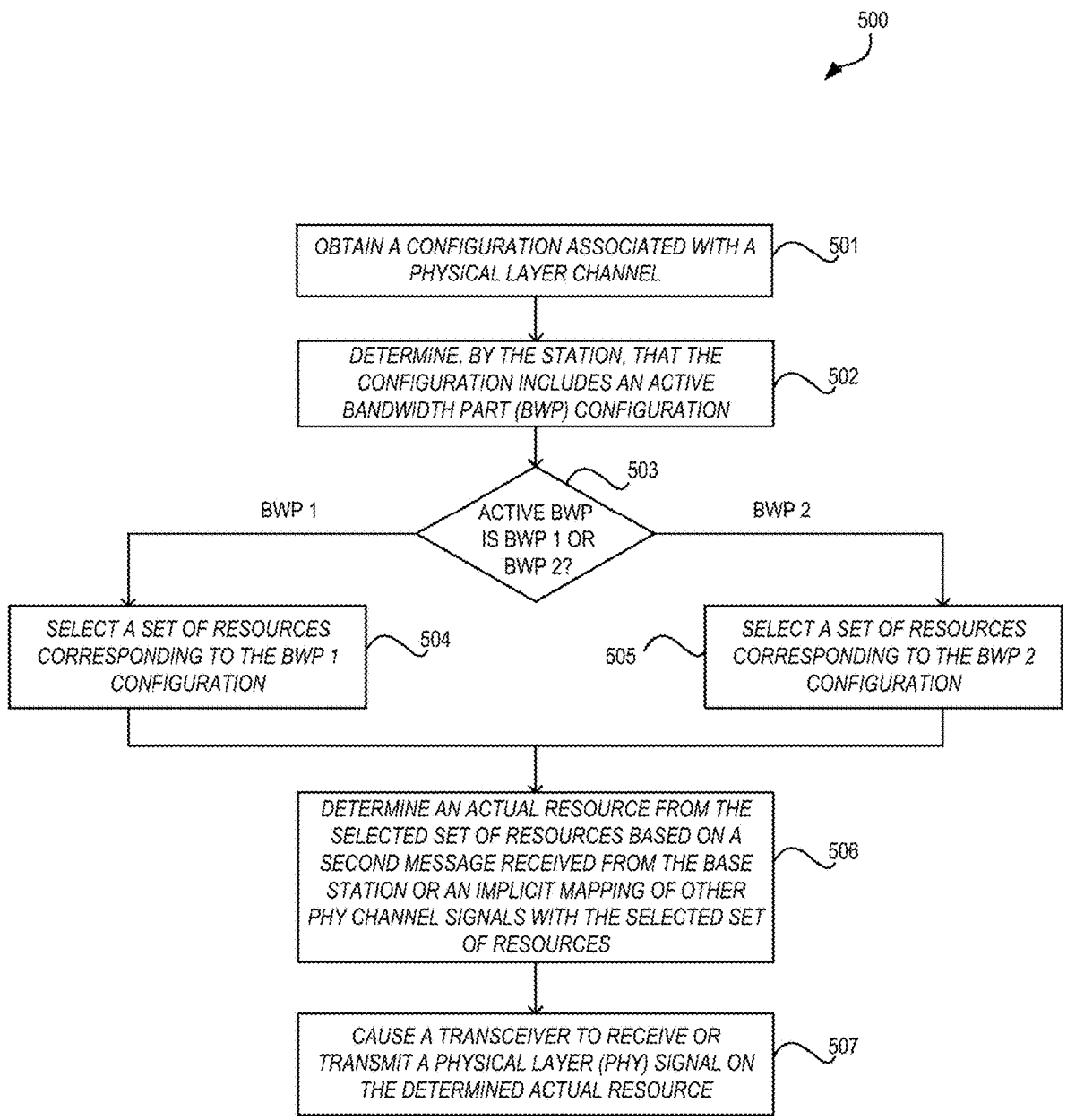
FIG. 5 illustrates a flow diagram of an example process for determining a resource from different resource sets configured for different BWP configurations in accordance with one or more implementations.

FIG. 5 illustrates a flow diagram of an example process 500 for determining a resource from different resource sets configured for different BWP configurations in accordance with one or more implementations. For explanatory purposes, the process 500 is primarily described herein with reference to the receiver 220 of the wireless communication device 200 of FIG. 2. However, the process 500 is not limited to the receiver 220 of the wireless communication device 200 of FIG. 2, and one or more blocks (or operations) of the process 500 may be performed by one or more other components or chips of the wireless communication device 200. The wireless communication device 200 also is presented as an exemplary device and the operations described herein may be performed by any suitable device, such as one or more of the wireless communication devices 118-132. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The process 500 starts at step 501, where a station (e.g., 128, 200) obtains a configuration associated with a PHY channel. Next, at step 502, the station determines that the configuration includes a BWP configuration by receiving a message from a base station (e.g., 116) indicating that a received frame includes a BWP configuration for resource allocation scheduling. In some aspects, the received frame is a downlink frame associated with a downlink transmission with the base station. The received frame may include a PHY channel/signal (e.g., PDSCH, PDCCH). In some implementations, the BWP configuration is associated with the resource allocation scheduling for a downlink transmission. Next, at step 503, the station determines whether the BWP configuration is a first BWP configuration (referred to as "BWP 1") or a second BWP configuration (referred to as "BWP 2"). If the BWP configuration is BWP 1, then the process 500 proceeds to step 504. Otherwise, the process 500 proceeds to step 505.

Subsequently, when the BWP configuration is determined to be BWP 1, at step 504, the station selects a set of resources corresponding to the BWP 1 configuration. At step 505, where the BWP configuration is determined to be BWP 2, the station selects a set of resources corresponding to the BWP 2 configuration. Next, at step 506, the station determines an actual resource from the selected set of resources. In some aspects, the station may perform the selection using an indication included in a second message received from the base station. In other aspects, the station may perform the selection based on an implicit mapping of other PHY channels or signals with one or more resources of the selected set of resources such that an unmapped resource may be derived. Subsequently, at step 507, the station causes its transceiver (e.g., 205) to either receive a PDSCH signal or transmit a PUSCH signal, for example, on the determined actual resource.

In this implementation, different sets of resources are configured for different BWP configurations, e.g. BWP 1 and BWP 2. As depicted in FIG. 5, a station can at first select the resource set(s) corresponding to a particular BWP configuration, then determine the actual resource used for the transmission of a PHY channel or signal. If based on a certain DCI overhead, N resources can be configured for BWP 1 and BWP 2, respectively. Similarly, this approach can double the number of candidate resources available for resource allocation scheduling, and helps achieve substantially larger flexibility in resource allocation scheduling than the legacy approach (e.g., 4G LTE) without any additional PHY signaling overhead cost.

Figure 6:
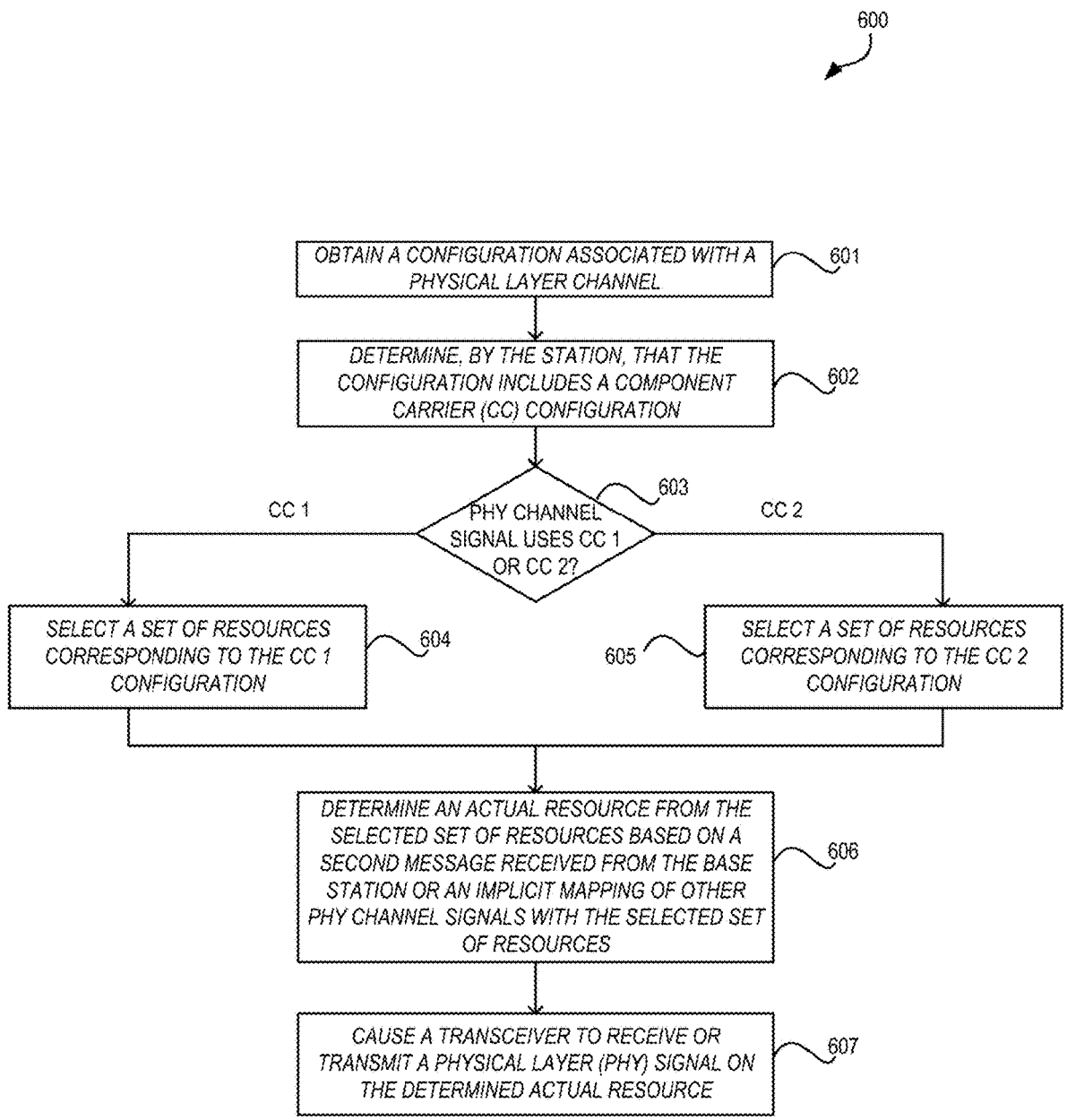
FIG. 6 illustrates a flow diagram of an example process for determining a resource from different resource sets configured for different component carrier configurations in accordance with one or more implementations.

FIG. 6 illustrates a flow diagram of an example process 600 for determining a resource from different resource sets configured for different component carrier configurations in accordance with one or more implementations. For explanatory purposes, the process 600 is primarily described herein with reference to the receiver 220 of the wireless communication device 200 of FIG. 2. However, the process 600 is not limited to the receiver 220 of the wireless communication device 200 of FIG. 2, and one or more blocks (or operations) of the process 600 may be performed by one or more other components or chips of the wireless communication device 200. The wireless communication device 200 also is presented as an exemplary device and the operations described herein may be performed by any suitable device, such as one or more of the wireless communication devices 118-132. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The process 600 starts at step 601, where a station (e.g., 128, 200) obtains a configuration associated with a PHY channel. Next, at step 602, the station determines that the configuration includes a component carrier configuration by receiving a message from a base station (e.g., 116) indicating that a received frame includes a component carrier configuration for resource allocation scheduling. In some aspects, the received frame is a downlink frame associated with a downlink transmission with the base station. The received frame may include a PHY channel/signal (e.g., PDSCH, PDCCH). In some implementations, the component carrier configuration is associated with the resource allocation scheduling for a downlink transmission. Next, at step 603, the station determines whether the component carrier configuration is a first component carrier configuration (referred to as "CC 1") or a second component carrier configuration (referred to as "CC 2"). If the component carrier configuration is CC 1, then the process 600 proceeds to step 604. Otherwise, the process 600 proceeds to step 605.

Subsequently, when the component carrier configuration is determined to be CC 1, at step 604, the station selects a set of resources corresponding to the CC 1 configuration. At step 605, where the component carrier configuration is determined to be CC 2, the station selects a set of resources corresponding to the CC 2 configuration. Next, at step 606, the station determines an actual resource from the selected set of resources. In some aspects, the station may perform the selection using an indication included in a second message received from the base station. In other aspects, the station may perform the selection based on an implicit mapping of other PHY channels or signals with one or more resources of the selected set of resources such that an unmapped resource may be derived. Subsequently, at step 607, the station causes its transceiver (e.g., 205) to either receive a PDSCH signal or transmit a PUSCH signal, for example, on the determined actual resource.

In this implementation, different sets of resources are configured for different component carrier configurations, e.g. CC 1 and CC 2. As depicted in FIG. 6, a station can at first select the resource set(s) corresponding to a particular component carrier configuration, then determine the actual resource used for the transmission of a PHY channel or signal. If based on a certain DCI overhead, N resources can be configured for CC 1 and CC 2, respectively. Similarly, this approach can double the number of candidate resources available for resource allocation scheduling, and helps achieve substantially larger flexibility in resource allocation scheduling than the legacy approach (e.g., 4G LTE) without any additional PHY signaling overhead cost.

Figure 7:
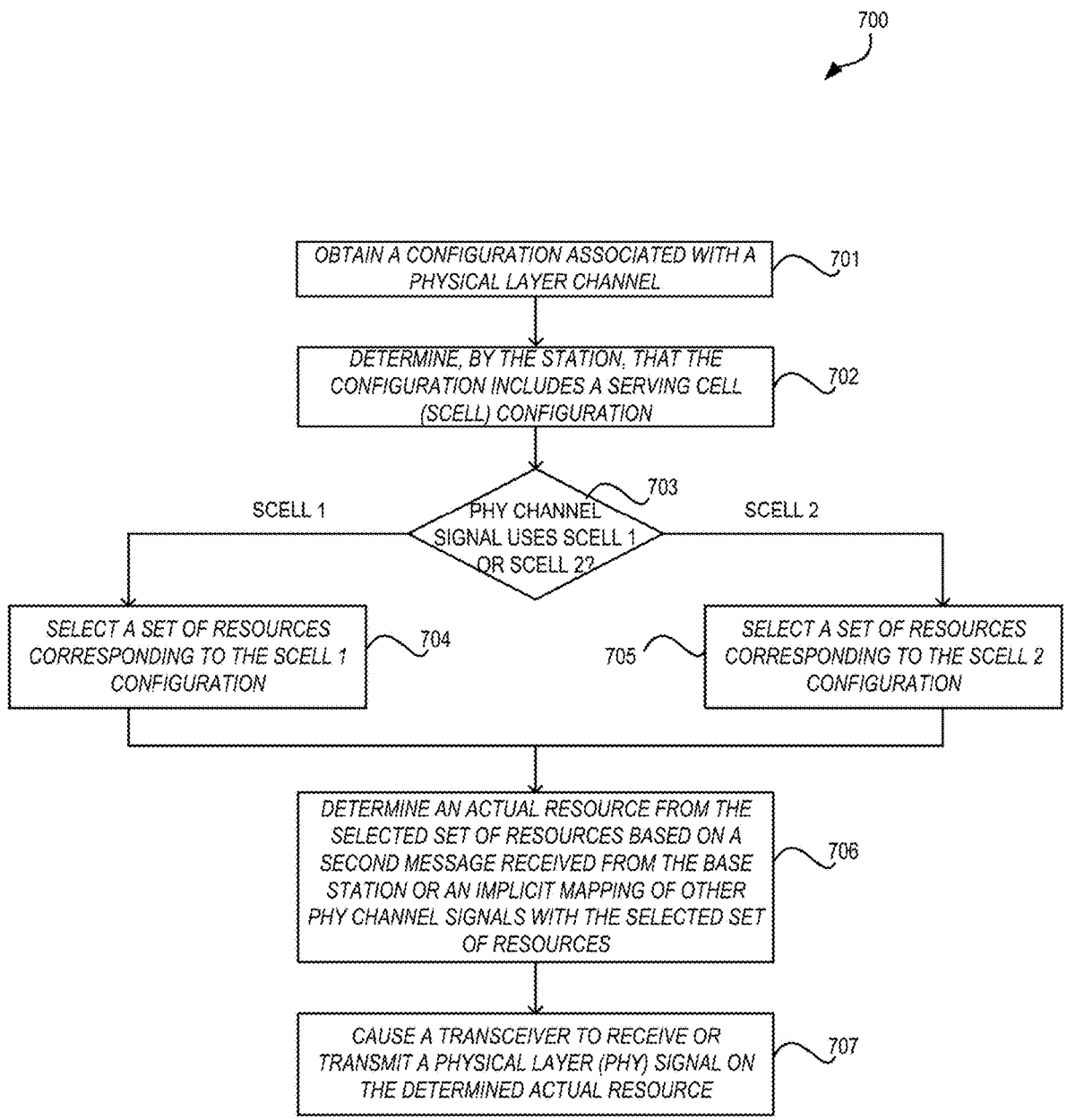
FIG. 7 illustrates a flow diagram of an example process for determining a resource from different resource sets configured for different serving cell configurations in accordance with one or more implementations.

FIG. 7 illustrates a flow diagram of an example process 700 for determining a resource from different resource sets configured for different serving cell configurations in accordance with one or more implementations. For explanatory purposes, the process 700 is primarily described herein with reference to the receiver 220 of the wireless communication device 200 of FIG. 2. However, the process 700 is not limited to the receiver 220 of the wireless communication device 200 of FIG. 2, and one or more blocks (or operations) of the process 700 may be performed by one or more other components or chips of the wireless communication device 200. The wireless communication device 200 also is presented as an exemplary device and the operations described herein may be performed by any suitable device, such as one or more of the wireless communication devices 118-132. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The process 700 starts at step 701, where a station (e.g., 128, 200) obtains a configuration associated with a PHY channel. Next, at step 702, the station determines that the configuration includes a serving cell configuration by receiving a message from a base station (e.g., 116) indicating that a received frame includes a serving cell configuration for resource allocation scheduling. In some aspects, the received frame is a downlink frame associated with a downlink transmission with the base station. The received frame may include a PHY channel/signal (e.g., PDSCH, PDCCH). In some implementations, the serving cell configuration is associated with the resource allocation scheduling for a downlink transmission. Next, at step 703, the station determines whether the serving cell configuration is a first serving cell configuration (referred to as "SCELL 1") or a second serving cell configuration (referred to as "SCELL 2"). If the serving cell configuration is SCELL 1, then the process 700 proceeds to step 704. Otherwise, the process 700 proceeds to step 705.

Subsequently, when the serving cell configuration is determined to be SCELL 1, at step 704, the station selects a set of resources corresponding to the SCELL 1 configuration. At step 705, where the serving cell configuration is determined to be SCELL 2, the station selects a set of resources corresponding to the SCELL 2 configuration. Next, at step 706, the station determines an actual resource from the selected set of resources. In some aspects, the station may perform the selection using an indication included in a second message received from the base station. In other aspects, the station may perform the selection based on an implicit mapping of other PHY channels or signals with one or more resources of the selected set of resources such that an unmapped resource may be derived. Subsequently, at step 707, the station causes its transceiver (e.g., 205) to either receive a PDSCH signal or transmit a PUSCH signal, for example, on the determined actual resource.

In this implementation, different sets of resources are configured for different serving cell configurations, e.g. SCELL 1 and SCELL 2. As depicted in FIG. 7, a station can at first select the resource set(s) corresponding to a particular serving cell configuration, then determine the actual resource used for the transmission of a PHY channel or signal. If based on a certain DCI overhead, N resources can be configured for SCELL 1 and SCELL 2, respectively. Similarly, this approach can double the number of candidate resources available for resource allocation scheduling, and helps achieve substantially larger flexibility in resource allocation scheduling than the legacy approach (e.g., 4G LTE) without any additional PHY signaling overhead cost.

Figure 8:
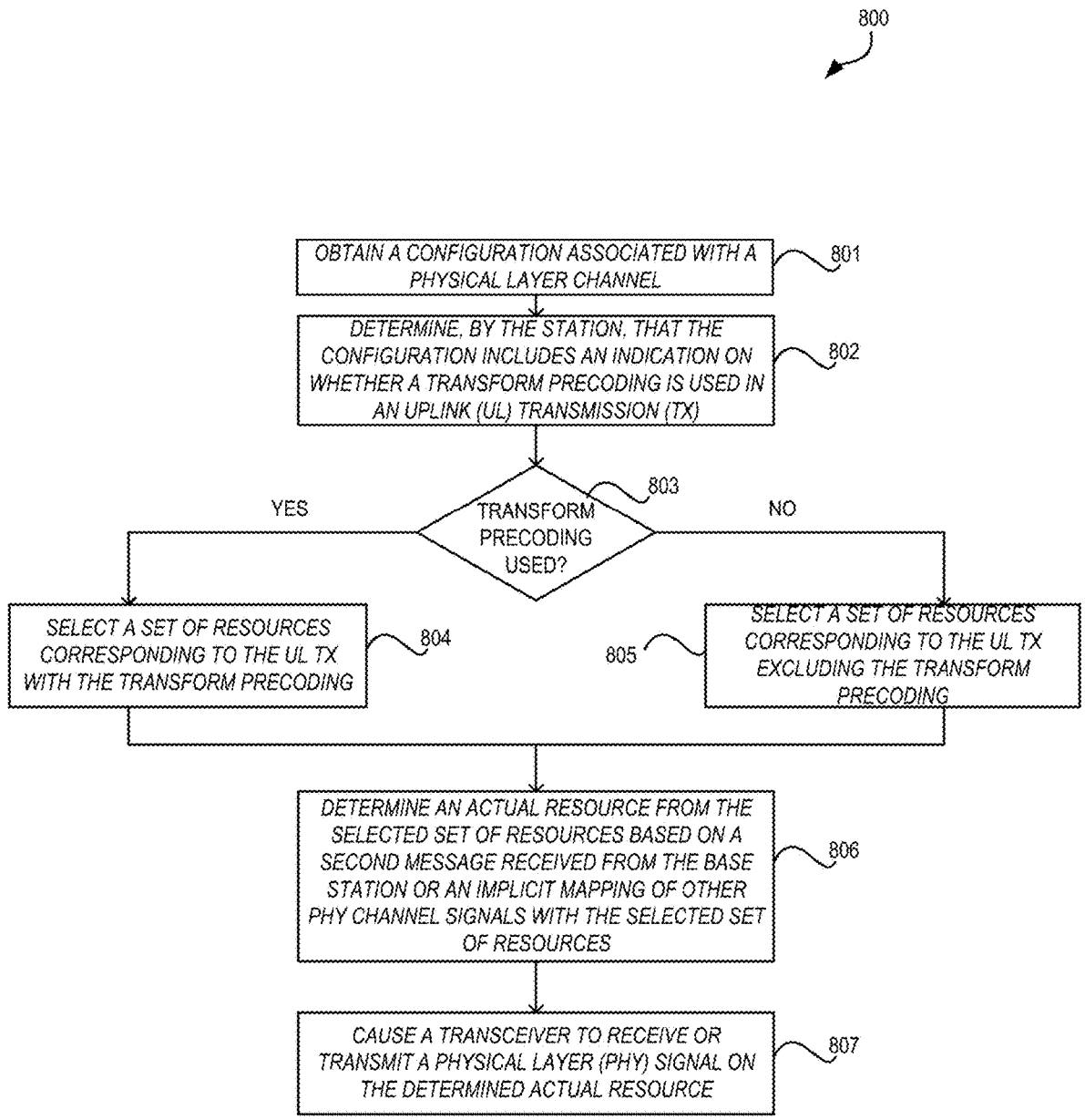
FIG. 8 illustrates a flow diagram of an example process for determining a resource from different resource sets configured for different transmission waveform or multiple access configurations in accordance with one or more implementations.

FIG. 8 illustrates a flow diagram of an example process 800 for determining a resource from different resource sets configured for different transmission waveform or multiple access configurations in accordance with one or more implementations. For explanatory purposes, the process 800 is primarily described herein with reference to the receiver 220 of the wireless communication device 200 of FIG. 2. However, the process 800 is not limited to the receiver 220 of the wireless communication device 200 of FIG. 2, and one or more blocks (or operations) of the process 800 may be performed by one or more other components or chips of the wireless communication device 200. The wireless communication device 200 also is presented as an exemplary device and the operations described herein may be performed by any suitable device, such as one or more of the wireless communication devices 118-132. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

The process 800 starts at step 801, where a station (e.g., 128, 200) obtains a configuration associated with a PHY channel. Next, at step 802, the station determines that the configuration includes a transform precoding configuration by receiving a message from a base station (e.g., 116) indicating that a received frame includes an indication on whether a transform precoding is used in an uplink transmission for resource allocation scheduling. In some aspects, the received frame is a downlink frame associated with a downlink transmission with the base station. As used herein, the term "an uplink transmission with transform precoding" is referred to as "discrete-fourier-transform-spread-OFDM (or DFT-s-OFDM)," and the term "an uplink transmission without transform precoding" is referred to as "cyclical-prefix-OFDM (or CP-OFDM)". Next, at step 803, the station determines whether the transform precoding is used in the uplink transmission. If the transform precoding is used, then the process 800 proceeds to step 804. Otherwise, the process 800 proceeds to step 805.

Subsequently, when the transform precoding is determined to be used in an uplink transmission, at step 804, the station selects a set of resources corresponding to the uplink transmission with transform precoding. At step 805, where the transform precoding is determined not to be used in an uplink transmission, the station selects a set of resources corresponding to the uplink transmission excluding the transform precoding. Next, at step 806, the station determines an actual resource from the selected set of resources. In some aspects, the station may perform the selection using an indication included in a second message received from the base station. In other aspects, the station may perform the selection based on an implicit mapping of other PHY channels or signals with one or more resources of the selected set of resources such that an unmapped resource may be derived. Subsequently, at step 807, the station causes its transceiver (e.g., 205) to either receive a PDSCH signal or transmit a PUSCH signal, for example, on the determined actual resource.

In this implementation, different sets of resources are configured for different transmission waveforms or multiple access schemes, e.g. if the transform precoding is used in an uplink transmission. As depicted in FIG. 8, a station can at first select the resource set(s) corresponding to the uplink transmission with transform precoding (e.g., DFT-s-OFDM) or without the transform precoding (e.g., CP-OFDM), then determine the actual resource used for the transmission of a PHY channel or signal. If based on a certain DCI overhead, N resources can be configured for the uplink transmission with transform precoding or without transform precoding, respectively. Similarly, this approach can double the number of candidate resources available for resource allocation scheduling, and helps achieve substantially larger flexibility in resource allocation scheduling than the legacy approach (e.g., 4G LTE) without any additional PHY signaling overhead cost.

Figure 9:
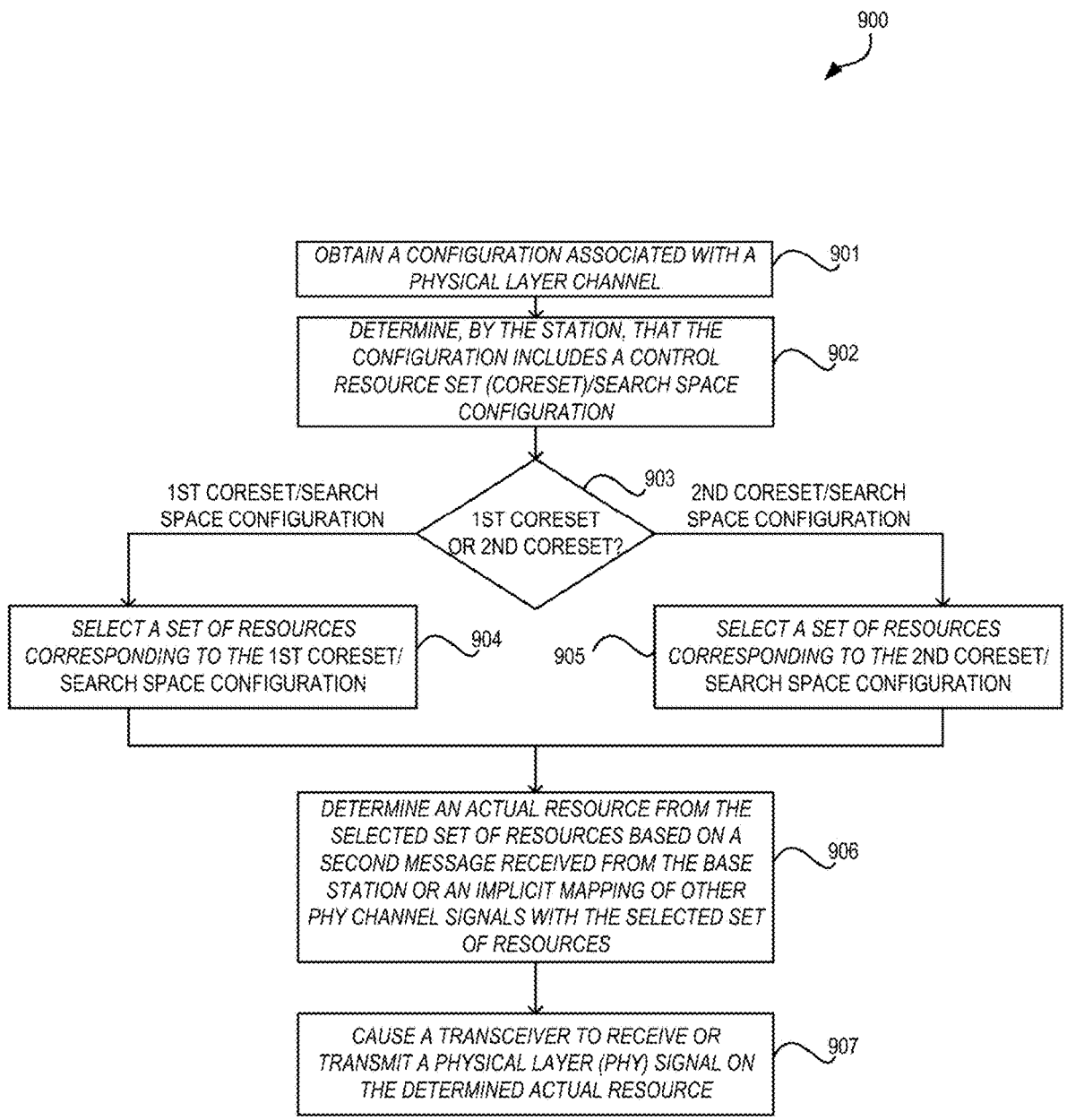
FIG. 9 illustrates a flow diagram of an example process for determining a resource from different resource sets configured for different control-resource-set/search space configurations in accordance with one or more implementations.

FIG. 9 illustrates a flow diagram of an example process 900 for determining a resource from different resource sets configured for different CORESET/search space configurations in accordance with one or more implementations. For explanatory purposes, the process 900 is primarily described herein with reference to the receiver 220 of the wireless communication device 200 of FIG. 2. However, the process 900 is not limited to the receiver 220 of the wireless communication device 200 of FIG. 2, and one or more blocks (or operations) of the process 900 may be performed by one or more other components or chips of the wireless communication device 200. The wireless communication device 200 also is presented as an exemplary device and the operations described herein may be performed by any suitable device, such as one or more of the wireless communication devices 118-132. Further for explanatory purposes, the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

The process 900 starts at step 901, where a station (e.g., 128, 200) obtains a configuration associated with a PHY channel. Next, at step 902, the station determines that the configuration includes a CORESET/search space configuration by receiving a message from a base station (e.g., 116) indicating that a received frame includes a CORESET/search space configuration for resource allocation scheduling. In some aspects, the received frame is a downlink frame associated with a downlink transmission with the base station. The received frame may include a PHY channel/signal (e.g., PDSCH, PDCCH). In some implementations, the CORESET/search space configuration is associated with the resource allocation scheduling for a downlink transmission. Next, at step 903, the station determines whether the received frame is configured with a first CORESET/search space configuration or a second CORESET/search space configuration. In some examples, the station also determines a periodicity configuration and/or time position associated with the CORESET/search space configuration. If the received frame is configured with the first CORESET/search space configuration, then the process 900 proceeds to step 904. Otherwise, the process 900 proceeds to step 905.

Subsequently, when the received frame is determined to be configured with the first CORESET/search space configuration, at step 904, the station selects a set of resources corresponding to the first CORESET/search space configuration. At step 905, where the received frame is determined to be configured with the second CORESET/search space configuration, the station selects a set of resources corresponding to the second CORESET/search space configuration. Next, at step 906, the station determines an actual resource from the selected set of resources. In some aspects, the station may perform the selection using an indication included in a second message received from the base station. In other aspects, the station may perform the selection based on an implicit mapping of other PHY channels or signals with one or more resources of the selected set of resources such that an unmapped resource may be derived. Subsequently, at step 907, the station causes its transceiver (e.g., 205) to either receive a PDSCH signal or transmit a PUSCH signal, for example, on the determined actual resource.

In this implementation, different sets of resources are configured for different CORESET/search space configurations, e.g. their periodicity configurations and/or time position. As depicted in FIG. 9, a station can at first select the resource set(s) corresponding to a particular CORESET/search space configuration, then determine the actual resource used for the transmission of a PHY channel or signal. If based on a certain DCI overhead, N resources can be configured for the first CORESET/search space configuration and the second CORESET/search space configuration, respectively. Similarly, this approach can double the number of candidate resources available for resource allocation scheduling, and helps achieve substantially larger flexibility in resource allocation scheduling than the legacy approach (e.g., 4G LTE) without any additional PHY signaling overhead cost.

Figure 10:
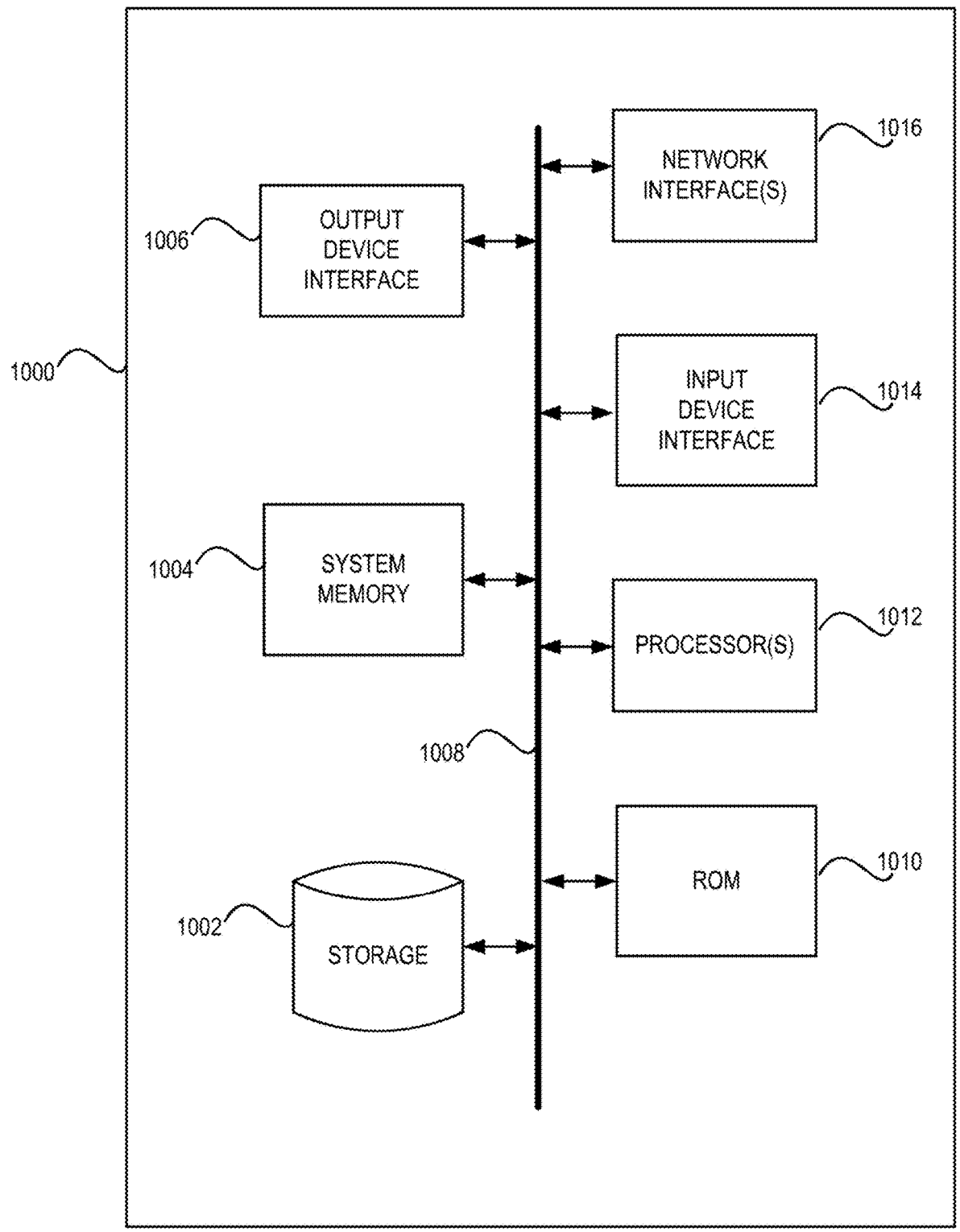
FIG. 10 conceptually illustrates an electronic system with which one or more implementations of the subject technology may be implemented.

FIG. 10 conceptually illustrates an electronic system 1000 with which one or more implementations of the subject technology may be implemented. The electronic system 1000, for example, can be a network device, a media converter, a desktop computer, a laptop computer, a tablet computer, a server, a switch, a router, a base station, a receiver, a phone, or generally any electronic device that transmits signals over a network. Such an electronic system 1000 includes various types of computer readable media and interfaces for various other types of computer readable media. In one or more implementations, the electronic system 1000 is, or includes, one or more of the wireless communication devices 118-132. The electronic system 1000 includes a bus 1008, one or more processing unit(s) 1012, a system memory 1004, a read-only memory (ROM) 1010, a permanent storage device 1002, an input device interface 1014, an output device interface 1006, and a network interface 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system. The permanent storage device 1002, on the other hand, is a read-and-write memory device. The permanent storage device 1002 is a non-volatile memory unit that stores instructions and data even when the electronic system 1000 is off. One or more implementations of the subject disclosure use a mass-storage device (such as a magnetic or optical disk and its corresponding disk drive) as the permanent storage device 1002.

Other implementations use a removable storage device (such as a floppy disk, flash drive, and its corresponding disk drive) as the permanent storage device 1002. Like the permanent storage device 1002, the system memory 1004 is a read-and-write memory device. However, unlike the permanent storage device 1002, the system memory 1004 is a volatile read-and-write memory, such as random access memory. System memory 1004 stores any of the instructions and data that the one or more processing unit(s) 1012 needs at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input device interface 1014 and the output device interface 1006. The input device interface 1014 enables a user to communicate information and select commands to the electronic system. Input devices used with the input device interface 1014 include, for example, alphanumeric keyboards and pointing devices (also called "cursor control devices"). The output device interface 1006 enables, for example, the display of images generated by the electronic system 1000. Output devices used with the output device interface 1006 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks (not shown) through one or more network interfaces 1016. In this manner, the computer can be a part of one or more network of computers (such as a local area network ("LAN"), a wide area network ("WAN"), or an Intranet, or a network of networks, such as the Internet. Any or all components of the electronic system 1000 can be used in conjunction with the subject disclosure.

Various examples of aspects of the disclosure are described below as clauses for convenience. These are provided as examples, and do not limit the subject technology.

Clause A1: A station for facilitating wireless communication in a broadband cellular network, the station comprising: one or more memories; and one or more processors coupled to the one or more memories, the one or more processors configured to cause: determining a first resource configuration of a plurality of resource configurations in at least one of a plurality of domains associated with a physical layer (PHY) channel or signal, wherein each of the plurality of domains corresponds to one of a demodulation reference signal mapping type, a bandwidth part configuration, a component carrier in carrier aggregation, a serving cell, a transform precoding for an uplink transmission, or a control resource set/search space configuration, selecting a first set of resources corresponding to the first resource configuration, determining an actual resource from a plurality of resources in the selected first set of resources, and occupying the determined actual resource to transmit or receive a corresponding PHY channel or signal.

Clause A2: A station for facilitating wireless communication in a broadband cellular network, the station comprising: a transceiver; one or more memories; and one or more processors coupled to the one or more memories, the one or more processors configured to cause: obtaining a configuration associated with a physical layer (PHY) channel, selecting a set of resources corresponding to the configuration from a plurality of resources, determining an actual resource from the selected set of resources, and causing the transceiver to transmit or receive a corresponding PHY signal on the determined actual resource.

Clause B1: A method, comprising determining whether a physical layer (PHY) channel or signal includes a first resource configuration of a plurality of resource configurations or a second resource configuration of the plurality of resource configurations in one of a plurality of domains, wherein each of the plurality of domains corresponds to one of a demodulation reference signal (DM-RS) mapping type, a bandwidth part configuration, a component carrier in carrier aggregation, a serving cell, a transform precoding for an uplink transmission, or a control resource set (CORE-SET)/search space configuration; selecting a first set of resources corresponding to the first resource configuration when the PHY channel or signal includes the first resource configuration; selecting a second set of resources corresponding to the second resource configuration when the PHY channel or signal includes the second resource configuration; determining an actual resource from a plurality of resources in the selected first set of resources or the selected second set of resources, and occupying the determined actual resource to transmit or receive a corresponding PHY channel or signal.

Clause B2: A method, comprising: obtaining a configuration associated with a physical layer (PHY) channel; selecting a set of resources corresponding to the configuration from a plurality of resources; determining an actual resource from the selected set of resources or the selected second set of resources; and causing a transceiver to transmit or receive a corresponding PHY signal on the determined actual resource.

Clause C1: A non-transitory computer-readable storage medium storing computer-executable instructions that, when executed by one or more processors, cause one or more processors to perform operations, the operations comprising: determining a first resource configuration of a plurality of resource configurations in at least one of a plurality of domains associated with a physical layer (PHY) channel or signal, wherein each of the plurality of domains corresponds to one of a demodulation reference signal mapping type, a bandwidth part configuration, a component carrier in carrier aggregation, a serving cell, a transform precoding for an uplink transmission, or a control resource set/search space configuration, selecting a first set of resources corresponding to the first resource configuration, determining an actual resource from a plurality of resources in the selected first set of resources, and occupying the determined actual resource to transmit or receive a corresponding PHY channel or signal.

Clause C2: A non-transitory computer-readable storage medium storing computer-executable instructions that, when executed by one or more processors, cause one or more processors to perform operations, the operations comprising: obtaining a configuration associated with a physical layer (PHY) channel, selecting a set of resources corresponding to the configuration from a plurality of resources, determining an actual resource from the selected set of resources, and causing a transceiver to transmit or receive a corresponding PHY signal on the determined actual resource.

In one or more aspects, examples of additional clauses are described below.

Clause A1: The one or more processors is configured to cause: processing a first message received from a base station, wherein the first set of resources is selected based on an indication included in the first message.

Clause A2: The one or more processors is configured to cause: processing a second message received from the base station, wherein the actual resource is determined based on an indication included in the second message, and wherein the second message follows the first message.

Clause A3: The one or more processors is configured to cause: processing a first message received from a base station; and obtaining from the first message predetermined control information on one or more of a demodulation reference signal (DM-RS) mapping type, bandwidth part (BWP) configuration, component carrier (CC), serving cell, transmission waveform, or multiple access schemes, wherein the first set of resources is selected based on an indication included in the first message and the predetermined control information obtained from the first message, and wherein the first message is received prior to the first message.

Clause A4: The first set of resources is selected based on predetermined control information on one or more of a demodulation reference signal (DM-RS) mapping type, bandwidth part (BWP) configuration, component carrier (CC), serving cell, when a transform precoding is utilized in an uplink (UL) transmission.

Clause A5: The actual resource is determined based on an implicit mapping between resources of the selected first set of resource with one or more other PHY channels or signals.

Clause A6: The PHY channel includes a physical downlink (DL) shared channel (PDSCH), a physical uplink (UL) shared channel (PUSCH), a physical DL control channel (PDCCH), a physical UL control channel (PUCCH), a physical random access channel (PRACH), and wherein the PHY signal corresponds to a channel state information reference signal (CSI-RS), a scheduling request (SR), or a sounding reference signal (SRS).

Clause A7: Each of the plurality of resource configurations corresponds to a different demodulation reference signal (DM-RS) mapping type of a plurality of DM-RS mapping types for a DL PHY channel or an UL PHY channel.

Clause A8: Each of the plurality of resource configurations corresponds to a different bandwidth part (BWP) configuration of a plurality of BWP configurations.

Clause A9: Each of the plurality of resource configurations corresponds to a different component carrier (CC) of a plurality of CCs in carrier aggregation.

Clause A10: Each of the plurality of resource configurations corresponds to a different serving cell of a plurality of serving cells.

Clause A11: Each of the plurality of resource configurations corresponds to a different transmission waveform of a plurality of transmission waveforms when a transform precoding is utilized in an uplink transmission.

Clause A12: Each of the plurality of resource configurations corresponds to a different access scheme of a plurality of access schemes when a transform precoding is utilized in an uplink transmission.

Clause A13: Each of the plurality of resource configurations corresponds to a different physical downlink control channel (PDCCH) configuration of a plurality of PDCCH configurations.

Clause A14: The configuration associated with a PHY channel comprises a demodulation reference signal (DM-RS) mapping type, a bandwidth part (BWP) configuration, a component carrier, a serving cell, a transmission waveform, multiple access schemes or a physical downlink control channel (PDCCH) configuration.

Clause A15: The transceiver is configured to receive a first message from a base station, and wherein the configuration is obtained according to the first message.

Clause A16: The transceiver is configured to receive a second message from the base station, and wherein the actual resource is determined based on an indication included in the second message.

Clause A17: Different configurations correspond to different sets of resources.

Clause A18: Multiple sets of resources are configured for the PHY channel, and wherein a different configuration corresponds to a different set of resources that comprises: each DM-RS mapping type corresponds to each set of resources; or each BWP configuration corresponds to each set of resources; or each component carrier corresponds to each set of resources; or each serving cell corresponds to each set of resources; or each transmission waveform corresponds to each set of resources; or each of the multiple access schemes corresponds to each set of resources; or each PDCCH configuration corresponds to each set of resources.

Clause B1: The one of the plurality of domains includes a demodulation reference signal (DM-RS) mapping type, and wherein the first resource configuration corresponds to a physical downlink shared channel (PDSCH)/physical uplink shared channel (PUSCH) mapping type A and the second resource configuration corresponds to a PDSCH/PUSCH mapping type B.

Clause B2: The one of the plurality of domains corresponds to a bandwidth part (BWP), and wherein the first resource configuration corresponds to a first BWP configuration and the second resource configuration corresponds to a second BWP configuration.

Clause B3: The one of the plurality of domains corresponds to a component carrier in a carrier aggregation for the PHY channel or signal, and wherein the first resource configuration corresponds to a first component carrier and the second resource configuration corresponds to a second component carrier.

Clause B4: The one of the plurality of domains corresponds to a serving cell for the PHY channel or signal, and wherein the first resource configuration corresponds to a first serving cell and the second resource configuration corresponds to a second serving cell.

Clause B5: The one of the plurality of domains corresponds to a transform precoding in an uplink transmission, and wherein the first resource configuration corresponds to a first transmission waveform for an uplink transmission with transform precoding and the second resource configuration corresponds to a second transmission waveform for an uplink transmission excluding transform precoding.

Clause B6: The one of the plurality of domains corresponds to a control resource set (CORESET)/search space configuration, and wherein the first resource configuration corresponds to a first CORESET/search space configuration and the second resource configuration corresponds to a second CORESET/search space configuration.

Clause B7: The configuration associated with a PHY channel comprises a demodulation reference signal (DM-RS) mapping type, a bandwidth part (BWP) configuration, a component carrier, a serving cell, a transmission waveform, multiple access schemes or a physical downlink control channel (PDCCH) configuration.

Clause B8: A transceiver is configured to receive a first message from a base station, and wherein the configuration is obtained according to the first message.

Clause B9: A transceiver is configured to receive a second message from the base station, and wherein the actual resource is determined based on an indication included in the second message.

Clause B10: Different configurations correspond to different sets of resources.

Clause B11: Multiple sets of resources are configured for the PHY channel, and wherein a different configuration corresponds to a different set of resources that comprises: each DM-RS mapping type corresponds to each set of resources; or each BWP configuration corresponds to each set of resources; or each component carrier corresponds to each set of resources; or each serving cell corresponds to each set of resources; or each transmission waveform corresponds to each set of resources; or each of the multiple access schemes corresponds to each set of resources; or each PDCCH configuration corresponds to each set of resources.

Clause C1: The operations comprise: obtaining radio resource control (RRC) signaling included in a downlink frame received from a base station, wherein the first resource configuration and the first set of resources are determined from the obtained RRC signaling.

Clause C2: The operations comprise: obtaining downlink control information (DCI) included in the downlink frame, wherein the DCI indicates an index that corresponds to the actual resource in the selected first set of resources.

Clause C3: The configuration associated with a PHY channel comprises a demodulation reference signal (DM-RS) mapping type, a bandwidth part (BWP) configuration, a component carrier, a serving cell, a transmission waveform, multiple access schemes or a physical downlink control channel (PDCCH) configuration.

Clause C4: A transceiver is configured to receive a first message from a base station, and wherein the configuration is obtained according to the first message.

Clause C5: A transceiver is configured to receive a second message from the base station, and wherein the actual resource is determined based on an indication included in the second message.

Clause C6: Different configurations correspond to different sets of resources.

Clause C7: Multiple sets of resources are configured for the PHY channel, and wherein a different configuration corresponds to a different set of resources that comprises: each DM-RS mapping type corresponds to each set of resources; or each BWP configuration corresponds to each set of resources; or each component carrier corresponds to each set of resources; or each serving cell corresponds to each set of resources; or each transmission waveform corresponds to each set of resources; or each of the multiple access schemes corresponds to each set of resources; or each PDCCH configuration corresponds to each set of resources.

A method comprising one or more methods, operations or portions thereof described herein.

An apparatus comprising means adapted for performing one or more methods, operations or portions thereof described herein.

A hardware apparatus comprising circuits configured to perform one or more methods, operations or portions thereof described herein.

An apparatus comprising means adapted for performing one or more methods, operations or portions thereof described herein.

An apparatus comprising components operable to carry out one or more methods, operations or portions thereof described herein.

In one aspect, a method may be an operation, an instruction, or a function and vice versa. In one aspect, a clause may be amended to include some or all of the words (e.g., instructions, operations, functions, or components) recited in other one or more clauses, one or more words, one or more sentences, one or more phrases, one or more paragraphs, and/or one or more claims. During prosecution, one or more claims may be amended to depend on one or more other claims, and one or more claims may be amended to delete one or more limitations.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory. The computer-readable medium also can include any non-volatile semiconductor memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "station", "receiver", "transmitter", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An apparatus in a communication device, comprising:
a processor and a memory storing program instructions;
wherein when the program instructions are executed by the processor, the apparatus is configured to:
obtain a configuration associated with a physical layer (PHY) channel, wherein a plurality of sets of resources are configured for the PHY channel and wherein the configuration comprises a bandwidth part (BWP) configuration of a plurality of defined BWP configurations, each corresponding to a respective predefined set of resources of the plurality of sets of resources, and wherein different BWP configurations correspond to different sets of resources;
select a set of resources corresponding to the BWP configuration from the plurality of sets of resources; and
determine an actual resource from the selected set of resources of the BWP configuration;

wherein the processor is configured to obtain a first message from a base station, and wherein the configuration is obtained according to the first message; and wherein the processor is configured to obtain a second message from the base station, and wherein the actual resource is determined based on an indication included in the second message.

2. The apparatus of claim 1 wherein the PHY channel comprises a physical downlink (DL) shared channel (PDSCH), a physical uplink (UL) shared channel (PUSCH), a physical DL control channel (PDCCH), a physical UL control channel (PUCCH), and a physical random access channel (PRACH).

3. The apparatus of claim 1, wherein when the program instructions are executed by the processor, the apparatus is configured to select BWP configuration from the plurality of defined BWP configurations based on the BWP configuration being an active configuration.

4. The apparatus of claim 1, wherein the selected set of resources has N resources, where N is a positive integer.

5. The apparatus of claim 1, wherein a resource indication field in a downlink control information (DCI) indicates the actual resource.

6. A method for determining a resource in a wireless communication network, the method comprising:

obtaining, by a device of the wireless communication network, a configuration associated with a physical layer (PHY) channel, wherein a plurality of sets of resources are configured for the PHY channel and wherein the configuration comprises a bandwidth part (BWP) configuration of a plurality of defined BWP configurations, each corresponding to a respective predefined set of resources of the plurality of sets of resources, and wherein different BWP configurations correspond to different sets of resources;

selecting, by the device of the wireless communication network, a set of resources corresponding to the BWP configuration from the plurality of sets of resources; and determining, by the device of the wireless communication network, an actual resource from the selected set of resources or a selected second set of resources of the BWP configuration;

wherein the method further comprises:

receiving, by the device of the wireless communication network, a first message from a base station, wherein the configuration is obtained according to the first message; and receiving, by the device of the wireless communication network, a second message from the base station, wherein the actual resource is determined based on an indication included in the second message.

7. The method of claim 6 wherein the PHY channel comprises a physical downlink (DL) shared channel (PDSCH), a physical uplink (UL) shared channel (PUSCH), a physical DL control channel (PDCCH), a physical UL control channel (PUCCH), and a physical random access channel (PRACH).

8. A non-transitory computer-readable storage medium storing computer-executable instructions that, when executed by one or more processors, cause one or more processors to perform operations, the operations comprising:

obtaining a configuration associated with a physical layer (PHY) channel, wherein a plurality of sets of resources are configured for the PHY channel and wherein the configuration comprises a bandwidth part (BWP) configuration of a plurality of defined BWP configurations, each corresponding to a respective predefined set of resources of the plurality of sets of resources, and wherein different BWP configurations correspond to different sets of resources;

selecting a set of resources corresponding to the BWP configuration from the plurality of sets of resources; and determining an actual resource from the selected set of resources of the BWP configuration; and causing a transceiver to transmit or receive a corresponding PHY signal on the actual resource;

wherein the operations further comprise:

causing the transceiver to receive a first message from a base station, wherein the configuration is obtained according to the first message; and causing the transceiver to receive a second message from the base station, wherein the actual resource is determined based on an indication included in the second message.

9. The non-transitory computer-readable storage medium of claim 8 wherein the configuration associated with a PHY channel comprises a demodulation reference signal (DM-RS) mapping type, a bandwidth part (BWP) configuration, a component carrier, a serving cell, a transmission waveform, multiple access schemes, or a physical downlink control channel (PDCCH) configuration.

* * * * *